US008260910B2

(12) United States Patent
Schuba et al.

(10) Patent No.: US 8,260,910 B2
(45) **Date of Patent: *Sep. 4, 2012**

(54) METHOD AND APPARATUS FOR MONITORING A DATA STREAM TO DETECT A PATTERN OF DATA ELEMENTS USING BLOOM FILTERS

(75) Inventors: Christoph L. Schuba, Palo Alto, CA (US); Hal L. Stern, Livingston, NJ (US)

(73) Assignee: Oracle America, Inc., Redwood Shores, CA (US)

( * ) Notice: Subject to any disclaimer, the term of this patent is extended or adjusted under 35 U.S.C. 154(b) by 1263 days.

This patent is subject to a terminal disclaimer.

(21) Appl. No.: 11/523,928

(22) Filed: Sep. 19, 2006

(65) Prior Publication Data

US 2008/0071904 A1 Mar. 20, 2008

(51) Int. Cl.
*G06F 15/173* (2006.01)
*G06F 7/04* (2006.01)

(52) U.S. Cl. ........................................... 709/224; 726/4

(58) Field of Classification Search .................. 709/224; 726/4, 22, 23, 25
See application file for complete search history.

(56) References Cited

U.S. PATENT DOCUMENTS 5,701,464 A * 12/1997 Aucsmith ............................ 1/1
2005/0022009 A1* 1/2005 Aguilera et al. ............. 713/201
2005/0033803 A1* 2/2005 Vleet et al. .................... 709/203
2005/0086520 A1* 4/2005 Dharmapurikar et al. .... 713/201
2006/0074963 A1* 4/2006 Mihaila et al. ................ 707/102
2007/0073579 A1* 3/2007 Immorlica et al. .............. 705/14
2007/0237079 A1* 10/2007 Whitehead .................... 370/235
2008/0071903 A1* 3/2008 Schuba et al. ................ 709/224

OTHER PUBLICATIONS

Metwally et al. "Duplicate detection in click streams", IW3C2, 2005.*

Publication: entitled, "*Robust Correlation of Encrypted Attack Traffic Through Stepping Stones by Manipulation of Interpacket Delays*", by Wang and Reeves, Conference on Computer and Communications Security, Proceedings of the 10$^{th}$ ACM conference on Computer and Communications Security, Session: DOS protection, 2003, ISBN:1-58113-738-9, pp. 20-29.

Publication: entitled, "*Architecture for Multi-Stage Network Attack Traceback*", by W. Timothy Strayer et al., The IEEE Conference on Local Computer Networks 30th Anniversary (LCN '05) pp. 776-785.

* cited by examiner

*Primary Examiner* — Shirley Zhang
(74) *Attorney, Agent, or Firm* — Park, Vaughan, Fleming & Dowler LLP

(57) ABSTRACT

A system that determines whether a pattern of data elements was observed in a stream of data. During operation, the system receives a query which seeks to determine whether the pattern of data elements was observed in the stream of data. In response to the query, the system performs a number of lookups in an enhanced Bloom filter to determine whether the pattern of data elements was observed in the stream of data, wherein the enhanced Bloom filter includes multiple instances of a Bloom filter, and wherein each instance of the Bloom filter is associated with a different time interval. If so, the system generates a notification that the pattern of data elements was observed.

17 Claims, 15 Drawing Sheets

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | | | | | | | | | | | | | | | | |
| 2 | 1 | 0 | 1 | 1 | 1 | 1 | 1 | 1 | 1 | 1 | 1 | 1 | 1 | 1 | 1 | 1 |
| 3 | | | | | | | | | | | | | | | | |
| 4 | | | | | | | | | | | | | | | | |
| 5 | | | | | | | | | | | | | | | | |
| 6 | 1 | 0 | 1 | 1 | 1 | 1 | 1 | 1 | 1 | 1 | 1 | 1 | 1 | 1 | 1 | 1 |
| 7 | 1 | 0 | 1 | 1 | 1 | 1 | 1 | 1 | 1 | 1 | 1 | 1 | 1 | 1 | 1 | 1 |
| 8 | | | | | | | | | | | | | | | | |
| 9 | | | | | | | | | | | | | | | | |
| 10 | | | | | | | | | | | | | | | | |
| 11 | 1 | 0 | 1 | 1 | 1 | 1 | 1 | 1 | 1 | 1 | 1 | 1 | 1 | 1 | 1 | 1 |
| 12 | 1 | 1 | 1 | 1 | 1 | 1 | 1 | 1 | 1 | 1 | 1 | 1 | 1 | 1 | 1 | 1 |
| 13 | | | | | | | | | | | | | | | | |
| 14 | | | | | | | | | | | | | | | | |
| 15 | 1 | 0 | 1 | 1 | 1 | 1 | 1 | 1 | 1 | 1 | 1 | 1 | 1 | 1 | 1 | 1 |
| 16 | | | | | | | | | | | | | | | | |

BIT ARRAY 402

FIG. 4B

METHOD AND APPARATUS FOR MONITORING A DATA STREAM TO DETECT A PATTERN OF DATA ELEMENTS USING BLOOM FILTERS

RELATED APPLICATION

The subject matter of this application is related to the subject matter in a co-pending non-provisional application by the same inventors as the instant application and filed on the same day as the instant application entitled, "Method and Apparatus for Monitoring a Data Stream," having Ser. No. of 11/523,927 and filing date of 19 Sep. 2006.

BACKGROUND

1. Field of the Invention

The present invention relates to techniques for monitoring a data stream. More specifically, the present invention relates to a method and apparatus for determining whether a data element was observed in a data stream.

2. Related Art

Advances in semiconductor technology have led to increases in computing power, which in turn has led to a rapid growth in the rate that data is generated. The increased rate at which data can be generated has made it more difficult to process data in real time. One such real-time data-processing task is to determine whether a data element was observed within a specified time period in a stream of data. For example, a network operator may desire to query a network router to determine whether a source address was observed within a specified time period. Unfortunately, a router has a high throughput and therefore processes network packets at a fast rate. Hence, a fast and an efficient pattern matching technique is desirable.

One such technique uses Bloom filters to monitor the data stream. A Bloom filter is a bit array of m bits into which n keys, $\{\alpha_1, \alpha_2, \ldots, \alpha_n\} \in A$, are mapped by k hashing functions, $h_1, h_2, \ldots, h_k$. For example, FIG. 1A illustrates bit vector 102 used in a Bloom filter, wherein bit vector 102 includes m elements.

For each element in set A, the k hashing functions generate k bit positions within the bit vector. For example, if there are five hashing functions, five bit positions will be generated for each element in set A. Next, the elements of the bit vector at each of these bit positions are set to 1 (i.e., Boolean true) to indicate that the element in set A was observed.

FIG. 1B illustrates an exemplary Bloom filter 104 with 16 elements (i.e., m=16) after a first data element is observed. Furthermore, three hashing functions (i.e., k=3) are used to generate bit positions for bit vector 104. Note that prior to recording data into bit vector 104, all elements in bit vector 104 are initialized to a Boolean false (i.e., 0). For the sake of clarity, only the elements in bit vector 104 that are of interest are filled in with a value; the blank elements in bit vector 104 are set to 0 (i.e., false).

In this example, a first data element is received and the three hashing functions generate the three bit positions 2, 7, and 15. The elements of bit vector 104 that corresponds to bit positions 2, 7, and 15 are then marked with a Boolean true (i.e., 1) to indicate that the first data element was observed.

To determine whether an element exists in set A, the hashing functions are used to generate bit positions for the bit vector. If all of the elements in the bit vector corresponding to these bit positions are set to 1, then the element exists in set A (with a probability of a false positive match). However, if any element corresponding to these bit positions are set to 0, the element does not exist in set A.

FIG. 1C illustrates the exemplary Bloom filter 104 of FIG. 1B after a second data element is observed. When the second data element is observed, the three hashing functions generate the three bit positions 6, 11, and 12. Next, the elements of bit vector 104 corresponding to bit positions 6, 11, and 12 are marked to indicate that the second data element was observed.

Unfortunately, the bit positions that are generated by the hashing function for one element in set A can overlap a subset of bit positions generated by the hashing function for another element in set A. Hence, a given bit position can be set multiple times. As a result, when a query is made on the Bloom filter to determine whether an element exists in set A, the Bloom filter can produce a "false positive." Note that the Bloom filter can be tuned to reduce the possibility of generating a false positive. This is typically achieved by increasing the size of the bit vector.

Unfortunately, as more data is recorded into bit vector 104, the Bloom filter starts to fill up, and the number of false positives increases until the theoretical maximum false positive rate is reached based on the properties of the Bloom filter (i.e., m, n, and k). At this point, it is desirable to remove old data from the Bloom filter. However, the possibility of generating overlapping bit positions for different elements also makes it undesirable to remove a single element from the Bloom filter. For example if one of the hashing functions generates bit position 5 for element $a_1$ and one of the hashing functions also generates bit position 5 for element $a_4$, there is no way to remove element $a_1$ from the Bloom filter without also removing element $a_4$. Hence, removing elements from the Bloom filter in this manner increases the false negative rate.

The only reliable technique for removing elements from the Bloom filter is to clear the entire Bloom filter (i.e., set all elements of the Bloom filter to 0). Unfortunately, if the entire Bloom filter is cleared periodically, a gap in the data arises. For example, if a network operator determines that a particular source address was used in an attack, the network operator may desire to query the router to determine the source of packets used in the attack. However, if these packets were recorded just before the Bloom filter on the router was cleared, and the network operator queries the router after the Bloom filter on the router was cleared, the information about these packets is lost, and the system generates an incorrect response.

Hence, what is needed is a method and an apparatus for determining whether a data element was observed in a data stream without the problems described above.

SUMMARY

One embodiment of the present invention provides a system that determines whether a data element exists within a set of data elements observed from a stream of data. During operation, the system receives a query which seeks to determine whether the data element exists within a set of data elements observed from a stream of data. In response to the query, the system performs a lookup in an enhanced Bloom filter to determine whether the pattern of data elements was observed in the stream of data, wherein the enhanced Bloom filter includes multiple instances of a Bloom filter, and wherein each instance of the Bloom filter is associated with a different time interval. If so, the system generates a notification that the data element was observed.

In a variation on this embodiment, prior to receiving the query, the system observes the stream of data and stores data elements observed in the stream of data in the enhanced Bloom filter.

In a variation on this embodiment, while storing a given data element in the enhanced Bloom filter, the system marks multiple instances of the enhanced Bloom filter which is associated with multiple consecutive time intervals to indicate that the given data element was observed.

In a variation on this embodiment, while storing a given data element in the enhanced Bloom filter, the system marks a single instance of the enhanced Bloom filter associated with a current time interval to indicate that the given data element was observed.

In a variation on this embodiment, the system clears an instance of a Bloom filter associated with a preceding time interval which causes the enhanced Bloom filter to forget information associated with the preceding time interval.

In a further variation, prior to clearing the instance of the Bloom filter associated with a preceding time interval, the system stores the instance of the Bloom filter to a storage device.

In a variation on this embodiment, if the number of time intervals to be recorded exceeds the number of Bloom filter instances in the enhanced Bloom filter, the Bloom filter instance associated with the oldest time interval is cleared and is associated with the current time interval.

In a variation on this embodiment, the stream of data is a stream of network packets.

In a variation on this embodiment, the stream of data is a stream of stock market transaction data, which includes timestamps, and the method is used to determine whether a stock or a derivative of a stock was traded during a specified time period.

One embodiment of the present invention provides a system that determines whether a pattern of data elements was observed in a stream of data. During operation, the system receives a query which seeks to determine whether the pattern of data elements was observed in the stream of data. In response to the query, the system performs a number of lookups in an enhanced Bloom filter to determine whether the pattern of data elements was observed in the stream of data, wherein the enhanced Bloom filter includes multiple instances of a Bloom filter, and wherein each instance of the Bloom filter is associated with a different time interval. If so, the system generates a notification that the pattern of data elements was observed.

In a variation on this embodiment, prior to receiving the query, the system observes the stream of data, and records data elements observed in the stream of data in the enhanced Bloom filter.

In a variation on this embodiment, the pattern of data elements comprises a data element which is observed in multiple time intervals, and while determining whether the pattern of data elements was observed, the system determines whether the data element was observed in multiple instances of the Bloom filter within the enhanced Bloom filter.

In a variation on this embodiment, the pattern of data elements comprises multiple data elements which are observed in multiple time intervals, and while determining whether the pattern of data elements was observed, the system determines whether the multiple data elements were observed in multiple corresponding instances of the Bloom filter within the enhanced Bloom filter.

In a variation on this embodiment, the pattern of data elements comprises multiple data elements which are observed in a given time interval, and while determining whether the pattern of data elements was observed, the system determines whether the multiple data elements were observed in a corresponding instance of the Bloom filter within the enhanced Bloom filter.

In a variation on this embodiment, the data elements are network packets.

In a further variation, the network packets are generated during an interaction between a user and an Internet advertisement, and the query is used to identify instances of click fraud, which involves automatically or a manually clicking on an Internet advertisement to fraudulently generate a click-through for the Internet advertisement.

In a further variation, the network packets are generated by a computer virus attempting to infect computer systems, and the query is used to identify a cluster of packets sent by the computer virus from an infected computer system to multiple ports on other computer systems.

In a further variation, the network packets are generated by inter-blog communications, and the query is used to identify spam pings and spam comments, which are comments posted on spam blogs that are automatically propagated to other blogs with the intent to direct traffic to a specified website.

BRIEF DESCRIPTION OF THE FIGURES

FIG. 4B illustrates the exemplary enhanced Bloom filter of FIG. 4A after a second data element is observed during a second time interval in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention determines if a data item was observed in a data stream. In doing so, the present invention can make this determination efficiently. Hence, matches can be found even if the data rate is high (e.g., the data is generated at multiple gigabits-per-second).

One embodiment of the present invention uses an extension to a Bloom filter to determine if a data item was observed in a data stream. This extension allows observations to be removed after a specified period of time while maintaining a history of recently-observed data items.

Computer System

Figure 1A:
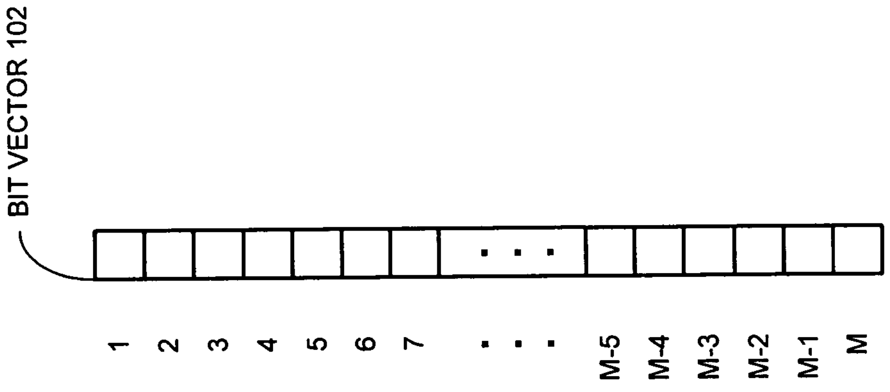
FIG. 1A illustrates a bit vector used in a Bloom filter.
Figure 1B:
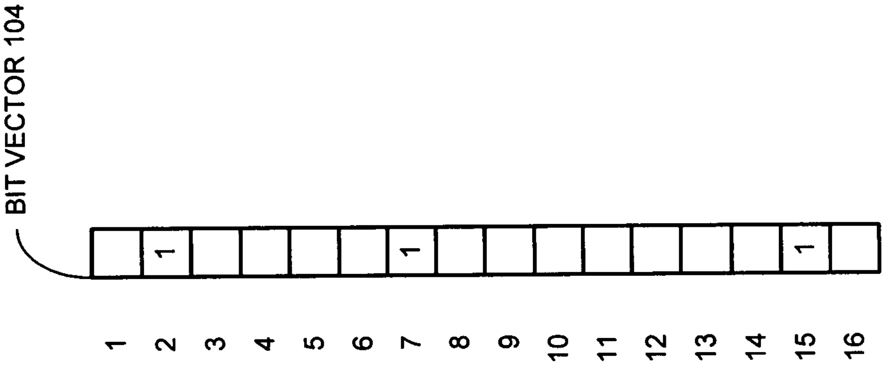
FIG. 1B illustrates an exemplary Bloom filter after a first data element is observed.
Figure 1C:
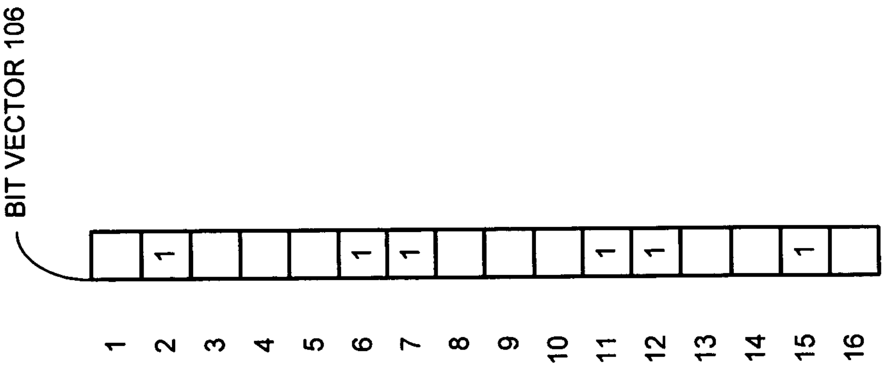
FIG. 1C illustrates the exemplary Bloom filter of FIG. 1B after a second data element is observed.
Figure 2:
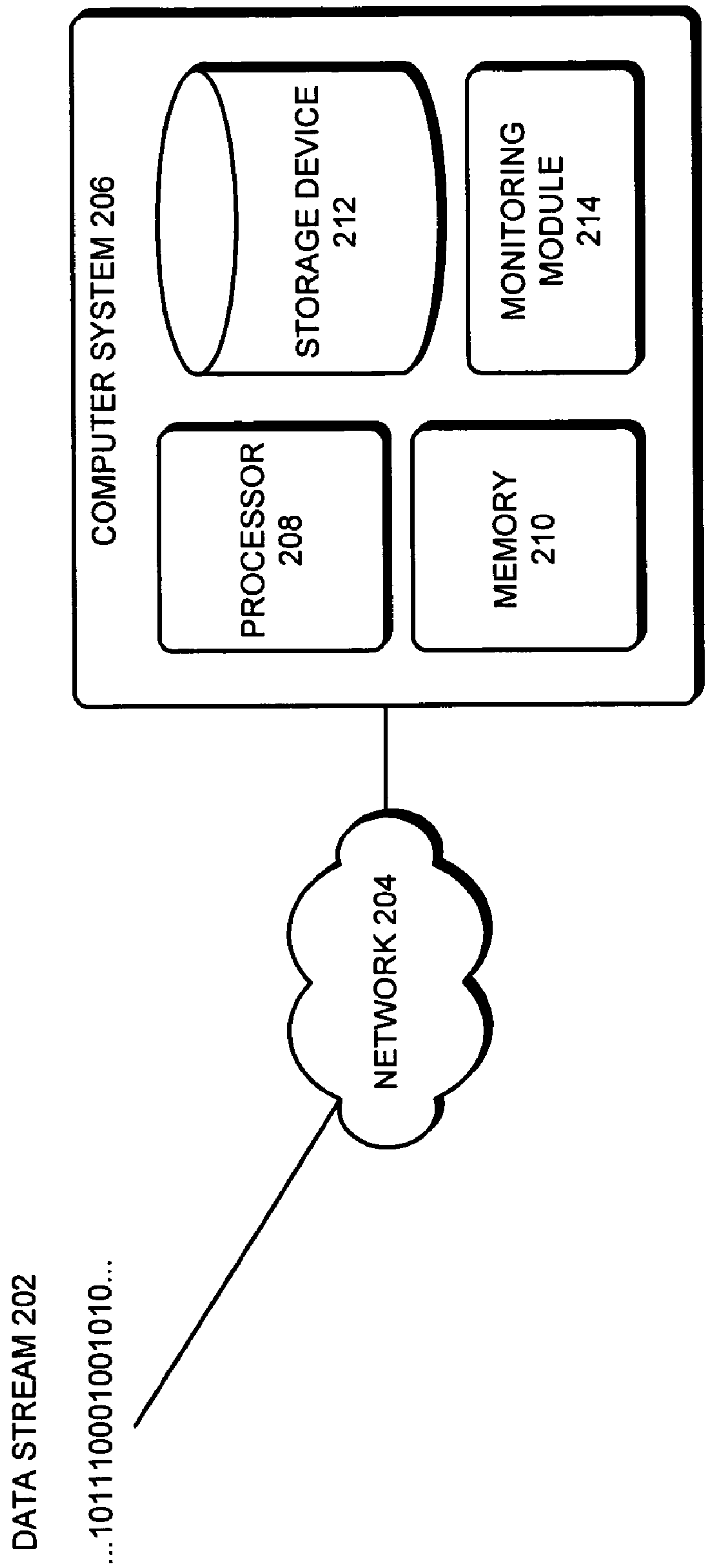
FIG. 2 presents a block diagram of a computer system that is configured to monitor a data stream in accordance with an embodiment of the present invention.

FIG. 2 presents a block diagram of computer system 206 that is configured to monitor data stream 202 in accordance with an embodiment of the present invention. Computer system 206 contains processor 208, memory 210, storage device 212, and monitoring module 214.

Computer system 206 can generally include any type of computer system, including, but not limited to, a computer system based on a microprocessor, a mainframe computer, a digital signal processor, a portable computing device, a personal organizer, a device controller, and a computational engine within an appliance. In one embodiment of the present invention, computer system 206 is a network router. In other embodiments of the present invention, computer system 206 can include, but is not limited to, a web server or a personal computer system.

Processor 208 can generally include any type of processor that can be contained within a computer system.

Storage device 212 can include any type of non-volatile storage device that can be coupled to a computer system. This includes, but is not limited to, magnetic, optical, and magneto-optical storage devices, as well as storage devices based on flash memory and/or battery-backed up memory. Note that storage device 212 can be located on a remote computer system or within a storage area network (SAN).

Data stream 202 is received at computer system 206 through network 204. Network 204 can generally include any type of wired or wireless communication channel capable of coupling together computing nodes. This includes, but is not limited to, a local area network, a wide area network, or a combination of networks. In one embodiment of the present invention, network 204 includes the Internet.

In one embodiment of the present invention, data stream 202 is transmitted directly to computer system 206. In this embodiment, data stream 202 is transmitted to computer system through a wired or a wireless connection from a source that generated data stream 202. In another embodiment of the present invention, data stream 202 is generated on computer system 206.

In one embodiment of the present invention, monitoring module 214 monitors and processes data stream 202. In one embodiment of the present invention, monitoring module 214 records data elements contained within data stream 202 in an enhanced Bloom filter. In another embodiment of the present invention, after storing data elements in the enhanced Bloom filter, the enhanced Bloom filter can be queried to determine whether a given element was observed within a specified time interval.

Extension to Bloom Filters

As mentioned above, in conventional Bloom filters there is no way to maintain entries only for a specified period of time. The only way to correctly remove entries is by resetting the entire Bloom filter to its initial values (e.g., 0).

One embodiment of the present invention extends the Bloom filter by adding a time dimension to the Bloom filter data structure. This extension effectively provides a sliding time window that facilitates the removal of old entries while maintaining a history of recently-observed data.

In one embodiment of the present invention, each bit within the bit vector is changed into a vector of bits (which results in a two-dimensional table of bits). In other words, the enhanced Bloom filter comprises multiple instances of Bloom filters. In one embodiment of the present invention, each vector of bits is a row of the table. In another embodiment of the present invention, each index in the vector of bits represents a time interval. Note that for the sake of clarity, this specification discusses the present invention such that the columns of the table correspond to the time intervals. However, the roles of the rows and columns can be switched without changing the functionality of the present invention.

In one embodiment of the present invention, if the Bloom filter is implemented as a two-dimensional bit matrix, the two-dimensional bit matrix is changed into a three-dimensional bit matrix to produce the enhanced Bloom filter, wherein the third dimension corresponds to time intervals.

Figure 3:
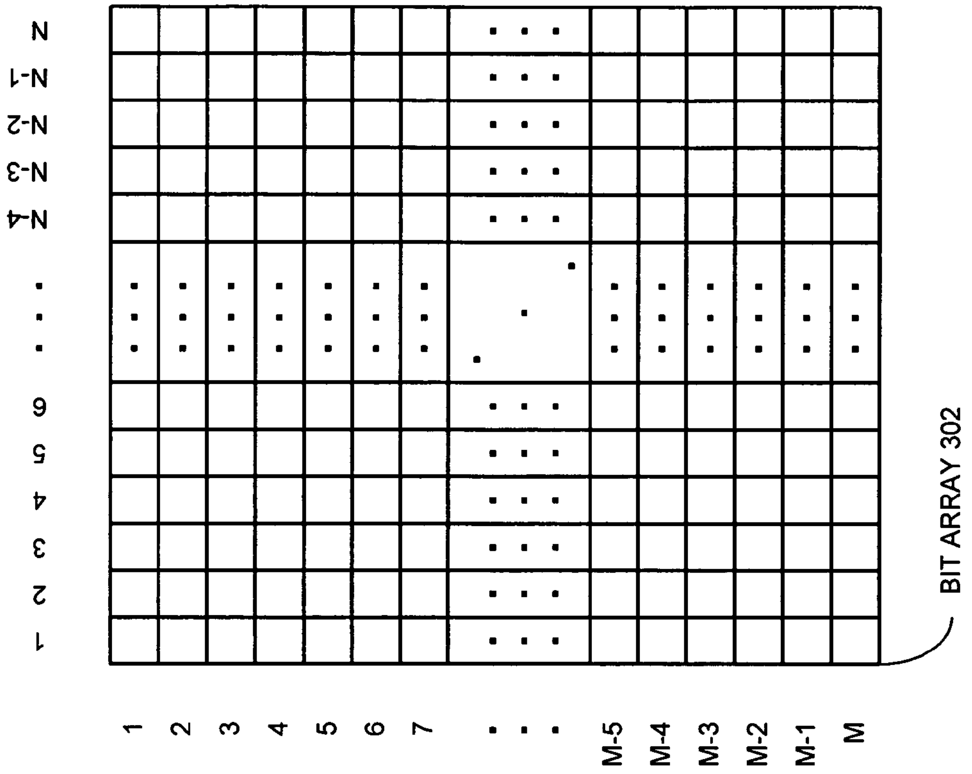
FIG. 3 illustrates an enhanced Bloom filter in accordance with an embodiment of the present invention.

FIG. 3 illustrates an enhanced Bloom filter in accordance with an embodiment of the present invention. This enhanced Bloom filter includes bit array 302, which contains m rows and n time intervals. In one embodiment of the present invention, the time intervals are of equal length. In another embodiment of the present invention, the time periods are related to each other through a mathematical function. Note that the roles of the rows and columns can be switched without changing the functionality of the present invention.

In one embodiment of the present invention, an index to a time interval is maintained, wherein the index to the time interval points to a column within the bit array. In one embodiment of the present invention, the index to the time interval is used to clear a column of the bit array. In another embodiment of the present invention, the index to the time interval is used to indicate which column of the bit array is to be used to record data elements observed from the data stream. In another embodiment of the present invention, a first index to a time interval is used to indicate which column of the bit array is to be used to record data elements observed from the data stream and a second index to a time interval is used to clear a column from a bit array. In this embodiment, the first index can be the same or can be different from the second index.

Figure 4A:
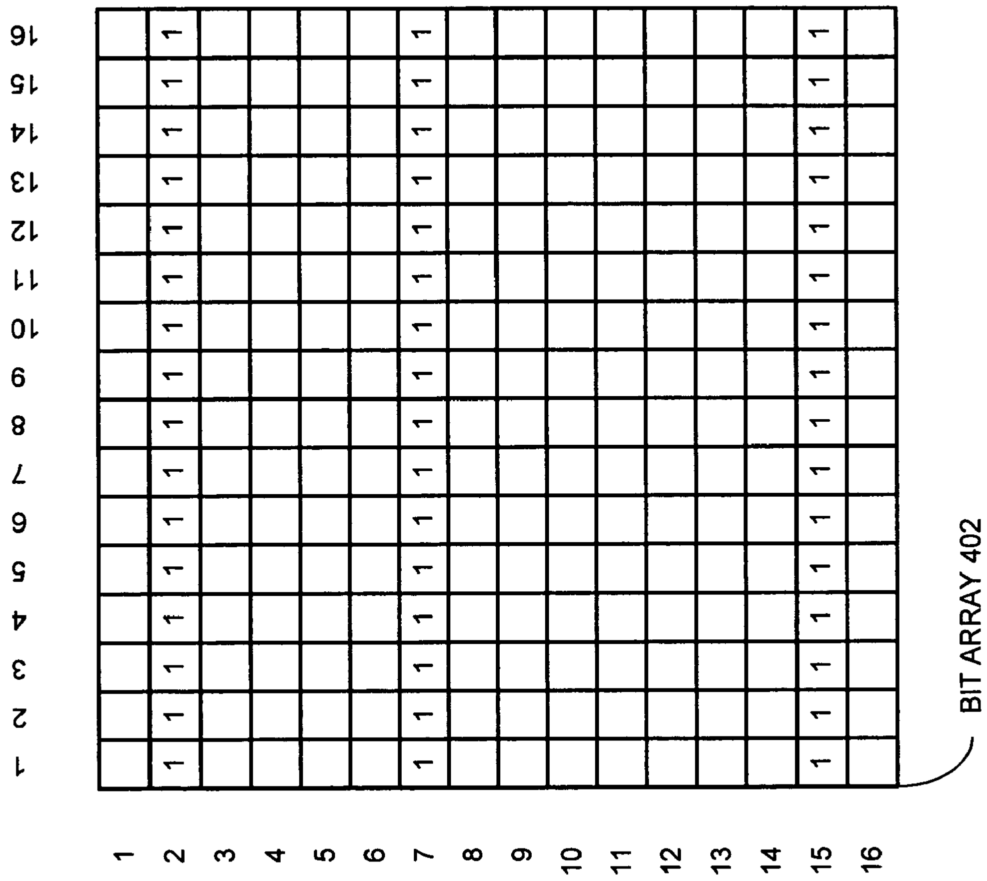
FIG. 4A illustrates an exemplary enhanced Bloom filter after a first data element is observed during a first time interval in accordance with an embodiment of the present invention.

FIG. 4A illustrates an exemplary enhanced Bloom filter after a first data element is observed during a first time interval in accordance with an embodiment of the present invention. In this example, the Bloom filter includes bit array 402, which contains 16 rows and 16 columns (i.e., 16 time intervals). This exemplary Bloom filter uses three hashing functions (k=3). Note that although bit array 402 as illustrated has an equal number of rows and columns, the number of rows and columns do not need to be equal. Also note that the number of rows and columns can vary depending on the application.

In one embodiment of the present invention, prior to recording data into bit array 402, all elements in bit array 402 are initially set to 0 (i.e., false). In another embodiment of the present invention, prior to recording data into bit array 402, all elements in bit array 402 are initially set to a default value. Note that for the sake of clarity, only the elements in bit array 402 that are of interest are filled in with a value. The blank elements in bit array 402 are either set to 0 (i.e., false) or to a default value.

In FIG. 4A, a first data element is received during a first time interval and the three hashing functions generate three row indexes 2, 7, and 15. In one embodiment of the present invention, all elements in the rows that correspond to the row indexes generated from the hashing functions are set to 1. For example, as illustrated in FIG. 4A, all elements of bit array 402 in rows 2, 7, and 15 are set to 1.

In one embodiment of the present invention, bit masks are used to indicate which elements in a row are to be written. For example, a bit mask can specify that all elements in the row are to be written when a data item is observed. A bit mask can also specify a subset of elements in the row that are to be written;

To determine whether a given data element is in the set of data elements observed from the stream of data, the hashing functions are applied to the given data element to generate a set of row indexes. In one embodiment of the present invention, the given data element is in the set of data-elements observed from the stream of data if, for each row that corresponds to the row indexes generated by the hash functions, one or more elements in each row is set to 1 (i.e., true). Note that since bit array 402 represents a specified time period (defined by the length of time for each time interval and the total number of time intervals), querying bit array 402 to determine whether the given data element was observed is the same as determining whether the given data element was observed during a time period covered by bit array 402.

In one embodiment of the present invention, a bitwise AND operation is performed between a row of the bit array and a string of 13 s with a length equal to the length of the row. For example, if the number of elements in a row is 8, the string is 0xFF (i.e., 11111111). If the result of the bitwise AND is a non-zero binary number, then the row contains 1's. If all rows corresponding to the generated row indexes are non-zero binary numbers, then the element was observed by the Bloom filter.

FIG. 4B illustrates the exemplary enhanced Bloom filter of FIG. 4A after a second data element is observed during a second time interval in accordance with an embodiment of the present invention. In this example, the second data element is received during the second time interval and the three hashing functions generate three row indexes 6, 11, and 12. Again, all elements of bit array 402 in rows 6, 11, and 12 are set to 1.

In one embodiment of the present invention, the system unmarks bits in a column that corresponds to the current time interval. In one embodiment of the present invention, an index to the time interval points to the current time interval (i.e., column) in bit array 402. This time index is used to determine which column to unmark. In FIG. 4B, the current time interval corresponds to the second column in bit array 402. Hence, the time index points to the second column, and the elements of bit array 402 in the second column are unmarked during the second time interval (i.e., set to 0).

Note that since the whole row of bit array 402 is set when a data element is observed, the unmarking operation can occur at any time during a time interval without changing the functionality of the present invention. If a query is made to determine whether a data element is in the set of data elements, the query determines whether one or more entries in each row of the bit array that corresponds to row indexes generated by the hash functions for the data element is set to one. Thus, even if a data element is recorded during the second time interval before the second column is unmarked, and a query is subsequently made to determine whether the data element was observed after the second column is unmarked, the present invention produces the correct result. For example, in FIG. 4B, the bits in row 6, column 2 and row 11, column 2 were recorded before the unmarking operation was performed on those bits, while the bit in row 12, column 2 was recorded after the unmarking operation was performed on this bit.

In one embodiment of the present invention, an index to the time interval points to a time interval other than the current time interval. In this embodiment, the elements of bit array 402 that correspond to the index are unmarked during the current time interval.

In one embodiment of the present invention, when unmarking elements in a given column, a bit mask is used to prevent the column that is in the process of being unmarked from being written. For example, if column 5 is being unmarked, a bit mask that prevents column 5 from being marked is used. In one embodiment of the present invention, after all elements in a column have been unmarked, the bit mask is changed so that all columns can be written.

Figure 4C:
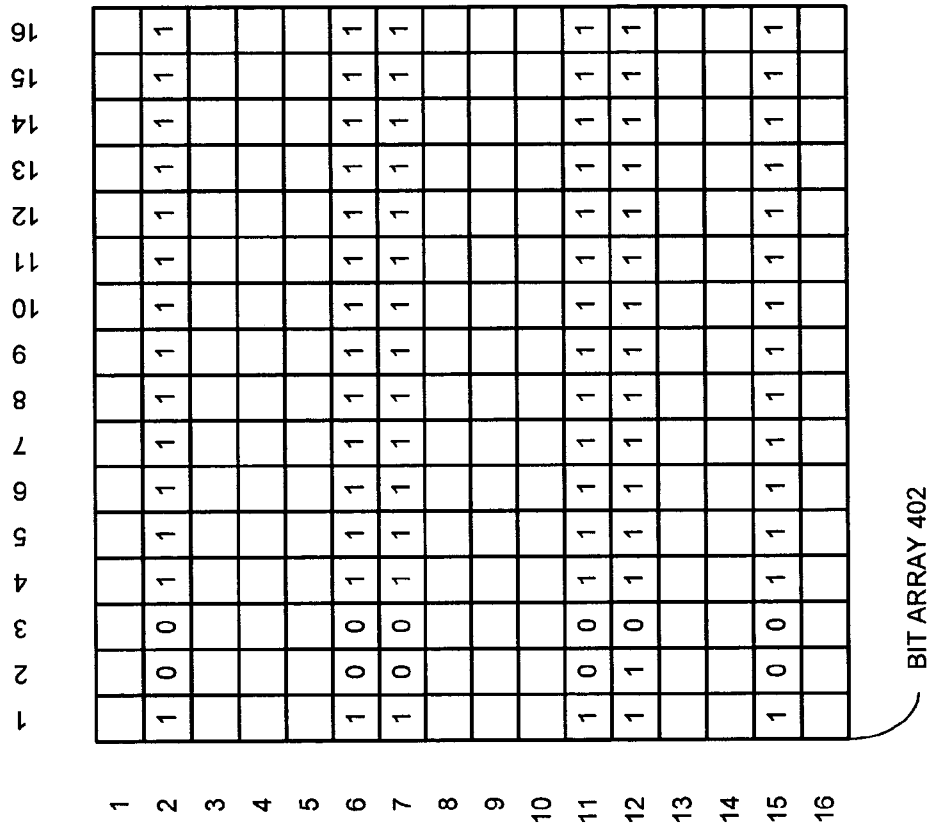
FIG. 4C illustrates the exemplary enhanced Bloom filter of FIG. 4B after a third time interval has elapsed in accordance with an embodiment of the present invention.

FIG. 4C illustrates the exemplary enhanced Bloom filter of FIG. 4B after a third time interval has elapsed in accordance with an embodiment of the present invention. In this example, no data elements were observed during the third time interval. Moreover, the third column is unmarked. If a query is made during the third time interval to determine whether either the first or the second data elements exists within the set of data elements observed by the Bloom filter within the time period of the Bloom filter, the answer would be yes to both queries.

Figure 4D:
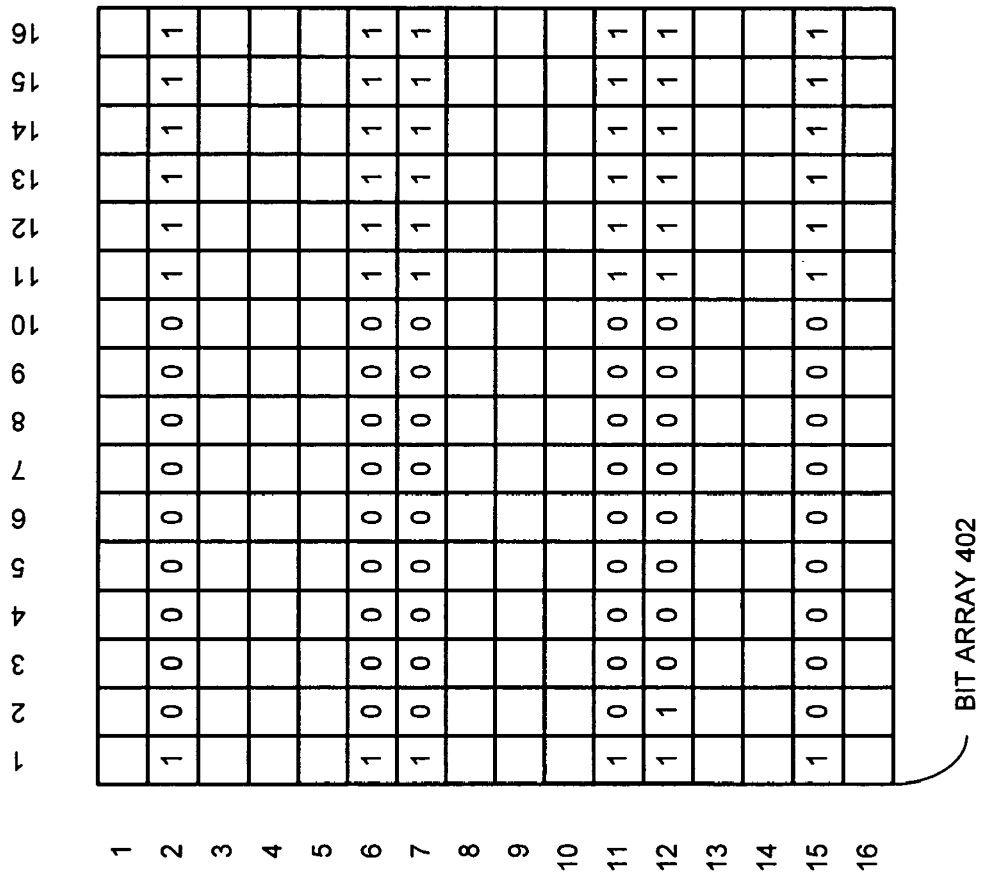
FIG. 4D illustrates the exemplary enhanced Bloom filter of FIG. 4C after a tenth time interval has elapsed in accordance with an embodiment of the present invention.

FIG. 4D illustrates the exemplary enhanced Bloom filter of FIG. 4C after a tenth time interval has elapsed in accordance with an embodiment of the present invention. In this example, no data elements were observed between the fourth and the tenth time intervals. Moreover, the fourth through the tenth columns are unmarked during their respective time intervals. Consider a query that is made during the tenth time interval to determine whether the first data element exists within the set of data elements observed by the Bloom filter within the time period of the Bloom filter. This query produces a result that indicates that the first data element exists within the set of data element observed by the Bloom filter.

In one embodiment of the present invention, when the last column of the bit array is reached (i.e., the last time interval), the Bloom filter wraps back around to the first column and continues recording data elements from the first column of the bit array. For example, for bit array 402, the seventeenth time interval is represented by column 1. This embodiment allows for a graceful expiration of old data elements while maintaining a recent history of observed data elements.

Note that in FIGS. 4A-4D, there is no way to determine in which time interval a given data element was received. The only query that can be made is whether a given data element was received within 16 time intervals (i.e., the number of time intervals in bit array 402). Note that the number of time intervals described in FIGS. 4A-4D is for illustrative purposes only and is not meant to limit the present invention. Also note that the number of time intervals is chosen based on the application.

Figure 5A:
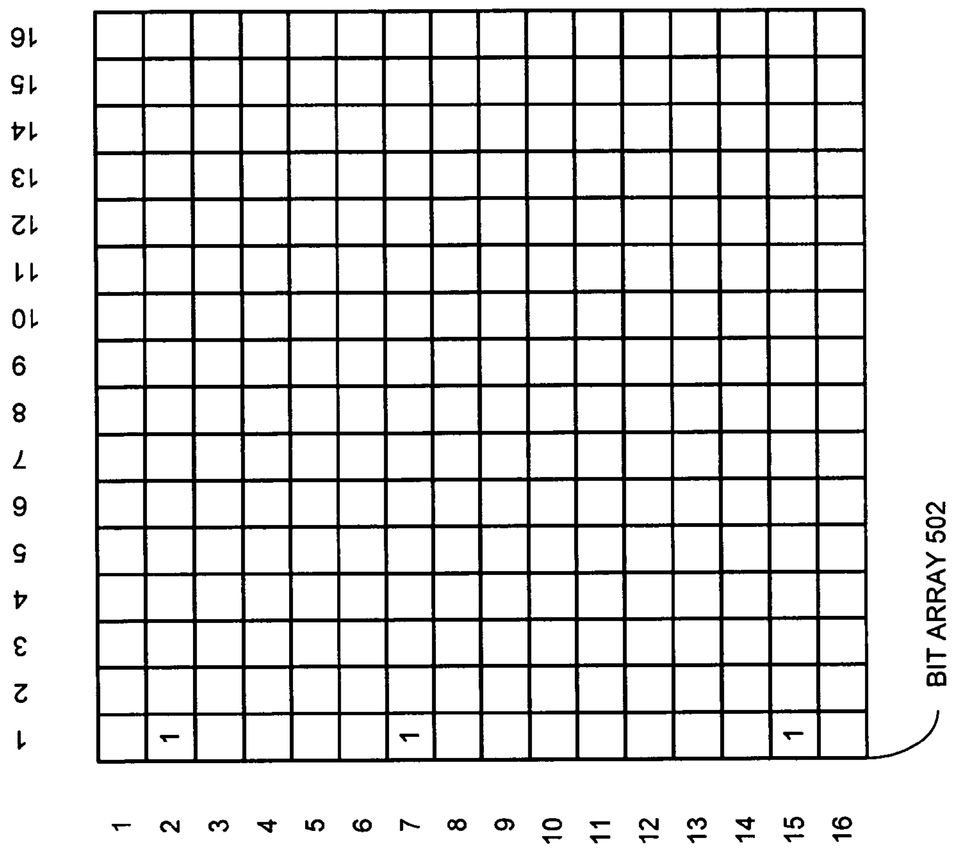
FIG. 5A illustrates another exemplary enhanced Bloom filter after a first data element is observed during a first time interval in accordance with an embodiment of the present invention.

FIG. 5A illustrates another exemplary enhanced Bloom filter after a first data element is observed during a first time interval in accordance with an embodiment of the present invention. In this example, the Bloom filter includes bit array 502, which contains 16 rows and 16 columns (i.e., 16 time intervals). This exemplary Bloom filter uses three hashing functions (k=3). Note that although bit array 502 as illustrated has an equal number of rows and columns, the number of rows and columns do not need to be equal. Also note that the number of rows and columns can vary depending on the application.

In one embodiment of the present invention, prior to recording data into bit array 502, all elements in bit array 502 are initially set to 0 (i.e., false). In another embodiment of the present invention, prior to recording data into bit array 502, all elements in bit array 502 are initially set to a default value. Note that for the sake of clarity, only the elements in bit array 502 that are of interest are filled in with a value. The blank elements in bit array 502 are either set to 0 (i.e., false) or to a default value In this example, the first data element is received during the first time interval and the three hashing functions generate three row indexes 2, 7, and 15. In one embodiment of the present invention, the elements of bit array 502 that correspond to the first time interval and that correspond to the row indexes generated from the hashing functions are set to 1. Hence, as illustrated in FIG. 5A, array elements (2, 1), (7, 1), and (15, 1) of bit array 502 are set to 1.

To determine whether a given data element is in the set of data elements observed from the stream of data, the hashing functions are applied to the given data element to generate a set of row indexes. In one embodiment of the present invention, the given data element is in the set of data elements observed from the stream of data if, for each row that corresponds to the row indexes generated by the hash functions, one or more elements in each row is set to 1 (i.e., true). Note that since bit array 502 represents a specified time period (defined by the length of time for each time interval and the total number of time intervals), querying bit array 502 to determine whether the given data element was observed is the same as determining whether the given data element was observed during a time period covered by bit array 502.

In one embodiment of the present invention, the given data element is in the set of data elements observed from the stream of data during a specific time interval if, for each row that corresponds to the row indexes generated by the hash function, the element in the column that corresponds to the specific time interval is set to 1 (i.e., true). For example, if a query is made to determine whether the data element was observed in the first time interval, the answer is yes.

In one embodiment of the present invention, a bitwise AND operation is performed between a row of the bit array and a string of bits with a length equal to the length of the row, wherein the bit that corresponds to the time interval of interest is set to 1 while the bits that correspond to the other time intervals are set to 0. For example, if the time interval of interest corresponds to the fifth column of bit array 502, the string of bits is 0x0800 (i.e., 0000100000000000). If the result of the bitwise AND is a non-zero binary number, then the row contains a 1 at the specified time interval. If all rows that correspond to the generated row indexes are non-zero binary numbers, then the element was observed by the Bloom filter during the specific time interval.

Figure 5B:
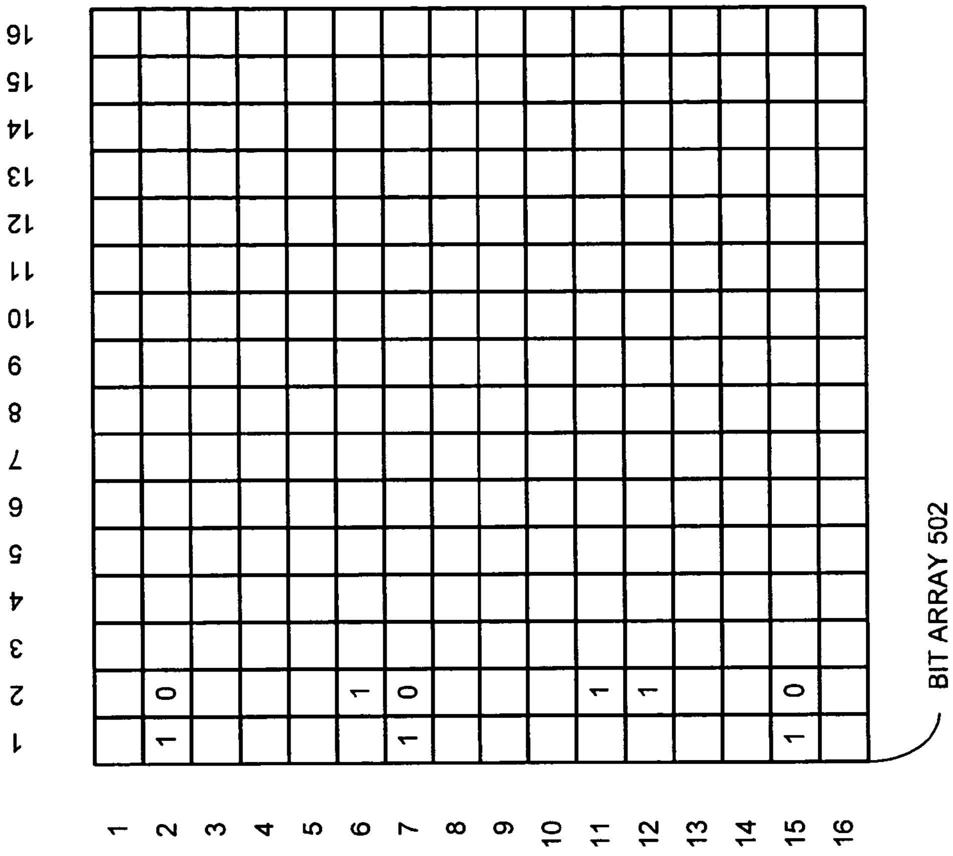
FIG. 5B illustrates the exemplary enhanced Bloom filter of FIG. 5A after a second data element is observed during a second time interval in accordance with an embodiment of the present invention.

FIG. 5B illustrates the exemplary enhanced Bloom filter of FIG. 5A after a second data element is observed during a second time interval in accordance with an embodiment of the present invention. In this example, the second data element is received during the second time interval and the three hashing functions generate three row indexes 6, 11, and 12. Again, only the elements of bit array 402 in rows 6, 11, and 12 that correspond to the second time interval are set to 1.

Figure 5C:
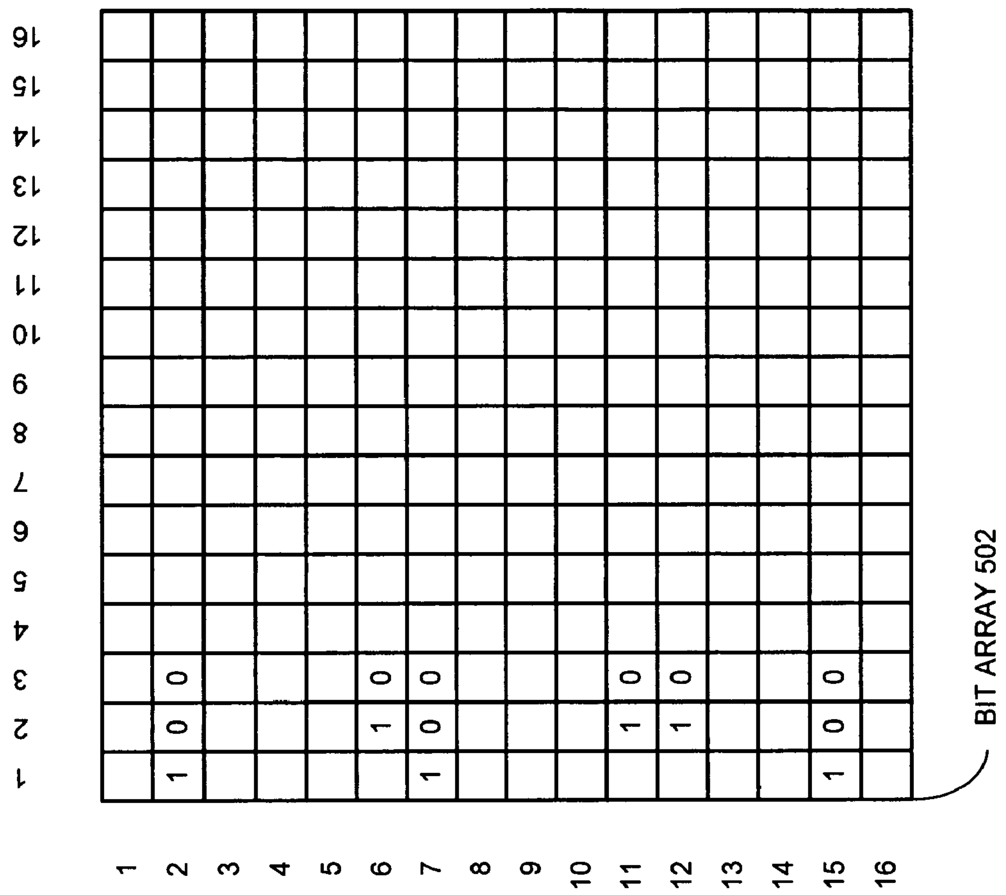
FIG. 5C illustrates the exemplary enhanced Bloom filter of FIG. 5B after a third time interval has elapsed in accordance with an embodiment of the present invention.

FIG. 5C illustrates the exemplary enhanced Bloom filter of FIG. 5B after a third time interval has elapsed in accordance with an embodiment of the present invention. In this example, no data elements were observed during the third time interval. If a query is made to determine whether the first or the second data elements were observed during the third time interval, the answer would be no to both queries. However, if a query is made to determine whether the first data element was observed during the first time interval, the answer would be yes.

Figure 5D:
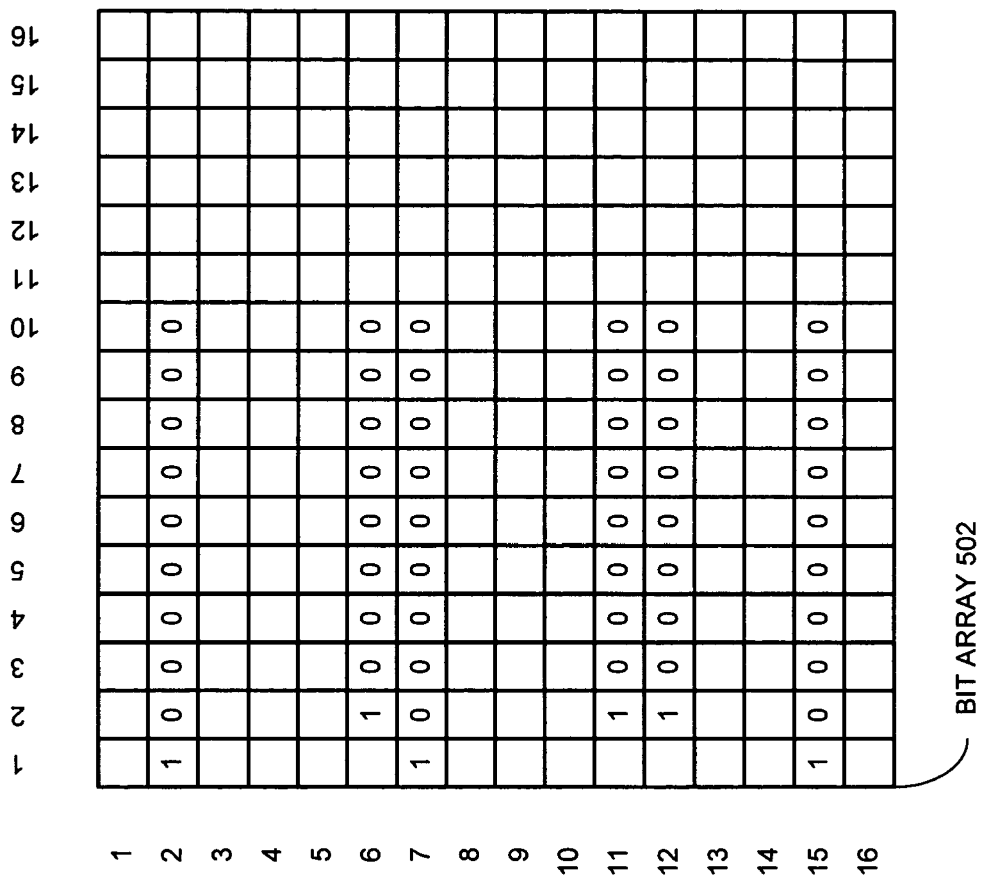
FIG. 5D illustrates the exemplary enhanced Bloom filter of FIG. 5C after a tenth time interval has elapsed in accordance with an embodiment of the present invention.

FIG. 5D illustrates the exemplary enhanced Bloom filter of FIG. 5C after a tenth time interval has elapsed in accordance with an embodiment of the present invention. In this example, no data elements were observed between the fourth and the tenth time intervals. If a query is made to determine whether the first or the second data elements were observed during the sixth time interval, the answer would be no to both queries. However, if a query is made to determine whether the second data element was observed during the second time interval, the answer would be yes.

In one embodiment of the present invention, when the last column of the bit array is reached (i.e., the last time interval), the Bloom filter wraps back around to the first column and continues recording data elements from the first column of the bit array.

In one embodiment of the present invention, the column that corresponds to the time interval farthest in the past from the current time interval is unmarked. For example, if the time interval is 7, table elements in column 8 are unmarked. In another embodiment of the present invention, a column corresponding to a specified time interval in the past is unmarked. For example, if the current time interval is 7, and the specified time interval in the past is column 2, then table elements in column 2 are unmarked during time interval 7. Note that the choice of which time interval to unmark depends on the application.

In one embodiment of the present invention, the unmarking operation occurs concurrently while the table is updated with new data or while a query is being performed.

In one embodiment of the present invention, prior to unmarking a column of bits the column is first stored to a storage device. This embodiment records observations for future use, such as billing or detailed analyses. In one embodiment of the present invention, the storage device is non-volatile memory.

In one embodiment of the present invention, the table size is fixed. Hence, the choice of the length of the time interval determines the rate at which entries are purged from the table. Choosing a longer vector of bits increase the length of the history of observations that can be maintained. Furthermore, the size of the vector of bits can be chosen such that the size of the bit vector is a unit that a central processing unit (CPU) can efficiently manipulate (e.g., 64 bits/word).

Note that the choice (length and granularity) of the time interval is flexible, thereby allowing for efficient trade-offs of the length of the time intervals (i.e., how far back in time recorded data observations are kept) and the amount of memory and computation required.

Example Implementations Involving Queries on a Single Data Element

In one embodiment of the present invention, a query is made into the enhanced Bloom filter to determine whether a given data element was observed during a time period covered by the enhanced Bloom filter. In another embodiment of the present invention, a query is made into the enhanced Bloom filter to determine whether a given data element was observed during a specific time interval.

IP Traceback Mechanisms Inside a Network

In a network, such as the Internet, network-based attacks can originate from almost any node within the network. Presently, there is little support for network operators to determine from which node an attack originated. A number of packet traceback techniques have been proposed to determine the source of the IP packets that belong to attack sessions. However, if attack traffic spans multiple transport layer sessions on the way from the attacker to the victim, a technique that correlates datagrams that traverse routers on different transport layer sessions is needed. Unfortunately, present techniques to correlate inbound to outbound packets at routers require that the data be stored for all observed inbound and outbound traffic. Since typical routers encounter high throughput, only a fraction of the required data can be recorded.

Figure 6:
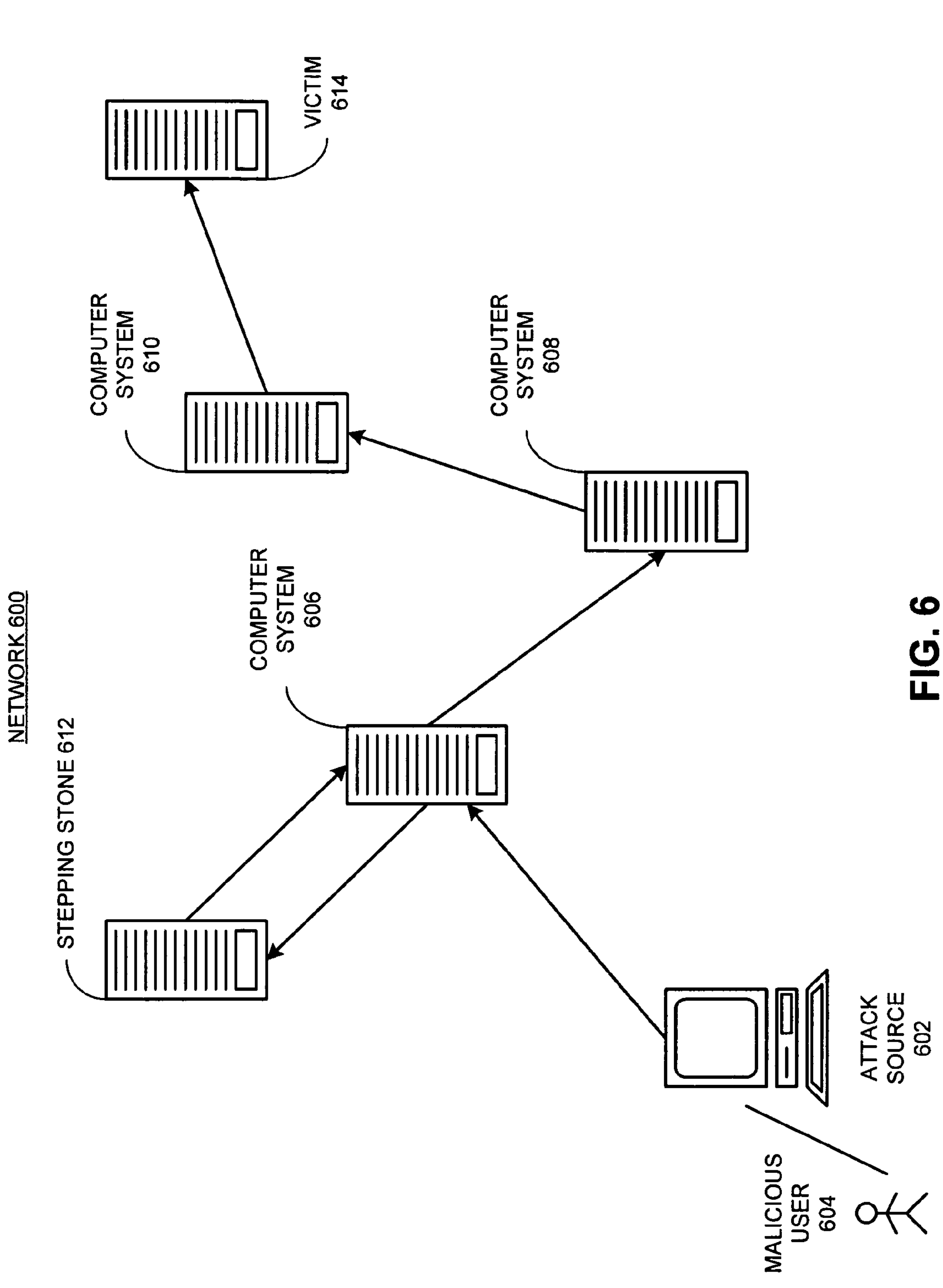
FIG. 6 illustrates a network of computer systems used to attack a victim system.

FIG. 6 illustrates a network of computer systems within network 600 used to attack victim computer system 614. Instead of using attack source 602 to launch a direct attack on victim computer system 614, malicious user 604 uses attack source computer system 602 to launch a "stepping-stone" attack on victim 614. Malicious user 604 first uses attack source computer system 602 to gain access to computer system 606. Note that computer system 606 is referred to as a "laundering host" because it is used to conceal where the attack originated. Malicious user 604 then uses computer system 606 to gain access to stepping stone computer system 612. Stepping stone computer system 612 is used to launch the actual attack on victim computer system 614. Stepping stone computer system 612 uses computer systems 606-610 (laundering hosts) to direct packets to victim 614. At each host, the packets can be modified to attempt to mask the true origin of the attack.

The present invention can be used with a number of matching techniques and metrics for stepping-stone correlation, including, but not limited to, using thumbprints, encoding watermarks, comparing on/off periods, comparing deviations in the propagation delays between two connections, assuming a maximum delay tolerance, or using state space metrics. (See W. Timothy Strayer, Christine Jones, Beverly Schwartz, Joanne Mikkelson, and Carl Livadas, "Architecture for Multi-Stage Network Attack Traceback." Workshop of Network Security, IEEE Local Computer Networks, Sydney, Australia, November 2005.)

If an attack is observed, a network operator may choose to query routers to determine the path through the network that the attack took in order to identify the attacking host. It is typically sufficient to store the data passing through the router for a certain period of time during which tracebacks are initiated on attack packets (or even suspicious packets).

The present invention can efficiently maintain a recent history of observed metrics. The present invention is tunable as to what is meant by recent history, both in terms of how far back the data goes (e.g., by changing the number of columns or the length of time represented by each time interval), and by the granularity of time intervals (e.g., the amount of time represented by each time interval) that is chosen to record observed data.

In IP traceback techniques that attempt to match data streams across stepping stones, data needs to be recorded at very high speeds. Therefore, using computationally-efficient hash functions is desirable. Fortunately, hash values are sometimes already calculated (oftentimes in hardware) as a result of another process. These hash values can include, but are not limited to, packet checksums or cyclic redundancy checks (CRCs).

Defining Time Quanta for Data that is not Self-quantized

The present invention can be used in conjunction with interval arithmetic to define time quanta for data items that are not self-quantized. For example, the present invention can be applied to stock market transactions. These data items typically contain timestamps. For example, individual stock trades executed in a stock market have a timestamp which indicates when the trade was executed. In this case, the Bloom filter is configured to run using intervals, such that multiple data items that map into the same interval are treated as equivalent. The number of elements in the bit vector and the length of time represented-by each time interval define an effective time period covered by the Bloom filter. For example, a bit vector with 127 bits, wherein each bit represents 10 seconds, results in about 20 minutes worth of trade activity that can be observed. Queries can then be executed against the Bloom filter which asks questions such as: "Have stock A and all of its derivates traded?" or "Have there been trades of stock A derivatives of more than 5,000 shares within 20 minutes of a transaction of stock A where the volume was 5,000 shares or more?"

Interval arithmetic is used on the timestamp for a given stock trade to determine in which time interval the given stock trade is placed. This allows for the use of programming languages supporting interval math arithmetic, possibly combined with processors with interval math support (i.e., with hardware assist), and allows for "tuning" the Bloom filter. For example, it may be desirable to make the time interval small to take advantage of the fact that the Bloom filter itself is constant in execution time.

Example Implementations Involving Queries on Multiple Time Intervals

In one embodiment of the present invention, a query is made into the enhanced Bloom filter to determine whether a given data element was observed over several time intervals. The following examples illustrate this embodiment.

Detecting Click Fraud

Internet advertisers rely on several metrics to determine whether their advertisements are being seen. These metrics include: (1) the number of impressions served by websites displaying the advertisement, and (2) the number of click-thoughs the advertisement generated. Note that an impression is a single view of an advertisement and a clickthrough is a click by a user which brings the user to a webpage associated with the advertisement. A clickthrough is typically more valuable to an advertiser than an impression, and therefore pays more money to a website displaying the advertisement that generated the clickthrough. As a result of the higher value for a clickthrough, click fraud has been on the rise. Click fraud occurs when an automated script or a user repeatedly clicks on an advertisement to generate clickthroughs. Click fraud can be used as a denial of service attack against other (possibly competing) advertisers, thereby consuming the maximum ad spend per month of the other advertiser with fraudulent clickthroughs. Click fraud can also be used in a nested scheme of websites that host advertisements wherein fraudulent clicks are used to generate revenue for the website without any true viewers of the advertisement.

Detecting click fraud is a challenge because traffic for large websites, such as Internet portal websites, can be high. Fortunately, the present invention can be used to perform real-time analysis on the source IP address of the click, and/or the referring site. For example, a click from a given source IP address for a given advertisement within a given time interval can be recorded in an enhanced Bloom filter. A query can then be made to identify clusters of clicks originating from the same source IP address within a given period of time.

Spam Pings and Spam Referrers

A Spam ping is a fraudulent "ping" generated from a blog. A ping is a message sent from a first blog to a ping server, which notifies other blogs that new content has been posted on the blog. Other blogs or content services which subscribe to the ping server receives notification of the new content posted on the blog. The goal of the spam ping is to direct traffic to websites that are not blogs. For example, a spam ping from a vendor can be linked to a webpage that displays products that the vendor is selling.

Blogs that support the TrackBack protocol can communicate with each other. For example, if a comment is posted on a first blog that refers to a second blog, the TrackBack mechanism notifies the second blog that a comment posted on the first blog refers to the second blog. Note that the first blog is typically referred to as a "referrer" blog. In response to the notification, the second blog displays a link or a summary of the comment posted on the first blog. Hence, a spam blog can be setup so that a comment posted on the spam blog, which refers to a first blog, exploits the TrackBack mechanism to cause the first blog to generate a link to the spam blog or to generate a summary of the comment posted on the spam blog.

The present invention facilitates early detection of the spam referrers and spam pings, which allows for the filtering of these spam blogs. The present invention can be used to observe statistically unlikely word groupings and to identify clusters of the same IP address or the same URL appearing in multiple blog comments, ping logs, and/or referrer logs across unrelated blogs. For example, consider a popular television show. There may be multiple blogs, blog aggregators, and search engines that refer to the television show, all of which are legitimate sources. If the blog receives multiple references from the same IP address or the same URL, or if multiple blogs receive references from the same IP address or the same URL, this is an indication that the referrer blog is a spam blog. The enhanced Bloom filter can be used to track the referring blog. A query can then be performed on the enhanced Bloom filter to determine whether a given blog has received a comment from the same referrer over a given time period. If so, the referrer is most likely a spam referrer. A query can also be performed on the Bloom filter to determine whether the same referrer has been seen on other blogs within a given timeframe. If so, the referrer is most likely a spam referrer.

Example Implementations Involving Queries on Multiple Data Elements

In another embodiment of the present invention, a query is made into the enhanced Bloom filter to determine whether a data element within a list of data elements was observed by the enhanced Bloom filter. The following example illustrates this embodiment.

Looking for an Emerging Virus Signature

A typical virus may attempt to infect a computer system using a vulnerability present on a port. For example, the virus may attempt to infect a target computer system by exploiting a vulnerability present on a well-known port. Once compromised, a target computer system may listen on a less obvious-port for instructions from another computer system.

One embodiment of the present invention can be used to store the port numbers used in communications between computer systems in the Bloom filter. This embodiment can then be queried to detect clusters of packets sent to and received from a pair of computer system targeted to well-known ports and to non-obvious ports over a given time period. These clusters can indicate the emergence of virus activity on the computer system. Furthermore, the Bloom filter can be used to look for (and discard) traffic on commonly-used ports, and therefore can be used to identify unusual or unlikely port traffic that may indicate unwanted network traffic. Note that in this case, a false positive from the Bloom filter is not harmful because a triggering event only signals a possible problem (e.g., unusual port traffic).

Summary

Figure 7:
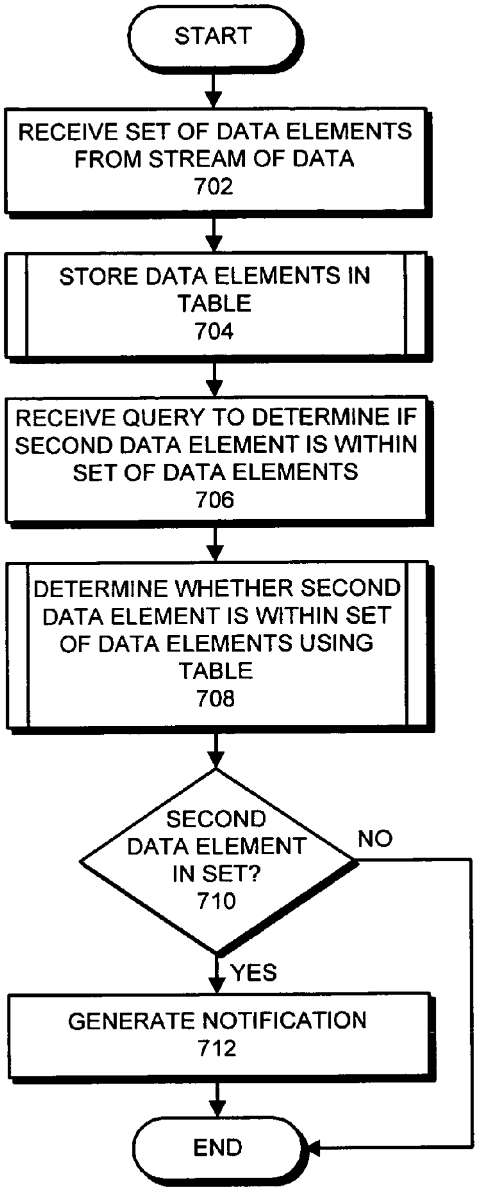
FIG. 7 presents a flow chart illustrating the process of determining whether a data element is within a set of data elements observed from a data stream in accordance with an embodiment of the present invention.

FIG. 7 presents a flow chart illustrating the process of determining whether a data element is within a set of data elements observed from a data stream in accordance with an embodiment of the present invention. The process begins when the system receives a set of data elements from a stream of data (step 702). Next, the system stores the set of data elements in a table, wherein the table comprises two or more axes, wherein a first axis of the table is associated with a set of time intervals (step 704). Note that step 704 is described in more detail in reference to FIG. 8 below. The system then receives a query to determine whether a second data element is within the set of data elements (step 706). In response to the query, the system determines whether the second data element is within the set of data elements using the table (step 708). Note that step 708 is described in more detail in reference to FIG. 9 below. If the second data element is within the set of data elements (step 710—yes), the system generate a notification that the second data element is within the set of data elements (step 712). In one embodiment of the present invention, the notification is a report that is stored on a storage device. In another embodiment of the present invention, the report is displayed to a user who made the query to the Bloom filter.

Figure 8:
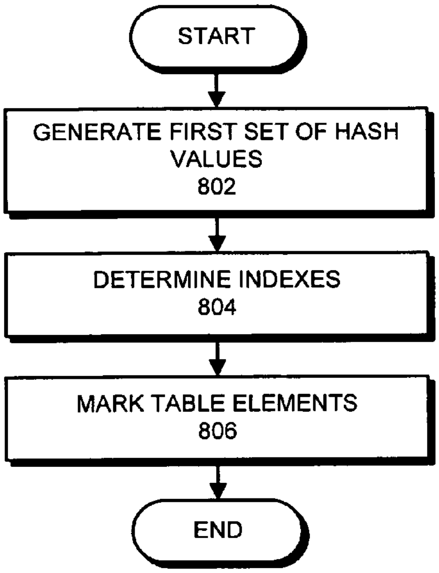
FIG. 8 presents a flow chart illustrating the process of storing an observed data element in accordance with an embodiment of the present invention.

FIG. 8 presents a flow chart illustrating the process of storing an observed data element in accordance with an embodiment of the present invention. The process begins when the system generates a first set of hash values using the first data element (step 802). In one embodiment of the present invention, while generating the first set of hash values, the system uses a hash function to generate a first hash value for the first data element and partitions the first hash value into the first set of hash values. In another embodiment of the present invention, while generating the first set of hash values, the system applies a plurality of hash functions to the first data element.

Next, the system determines indexes along a second axis of the table using the first set of hash values (step 804). The system then marks table elements in the table using the indexes (step 806). In one embodiment of the present invention, while marking table elements in the table, the system marks table elements along the first axis that correspond to the indexes to indicate that the first data element was observed. In another embodiment of the present invention, while marking table elements in the table, the system marks table elements that correspond to a current time interval and that correspond to the indexes to indicate that the first data element was observed during the current time interval.

Figure 9:
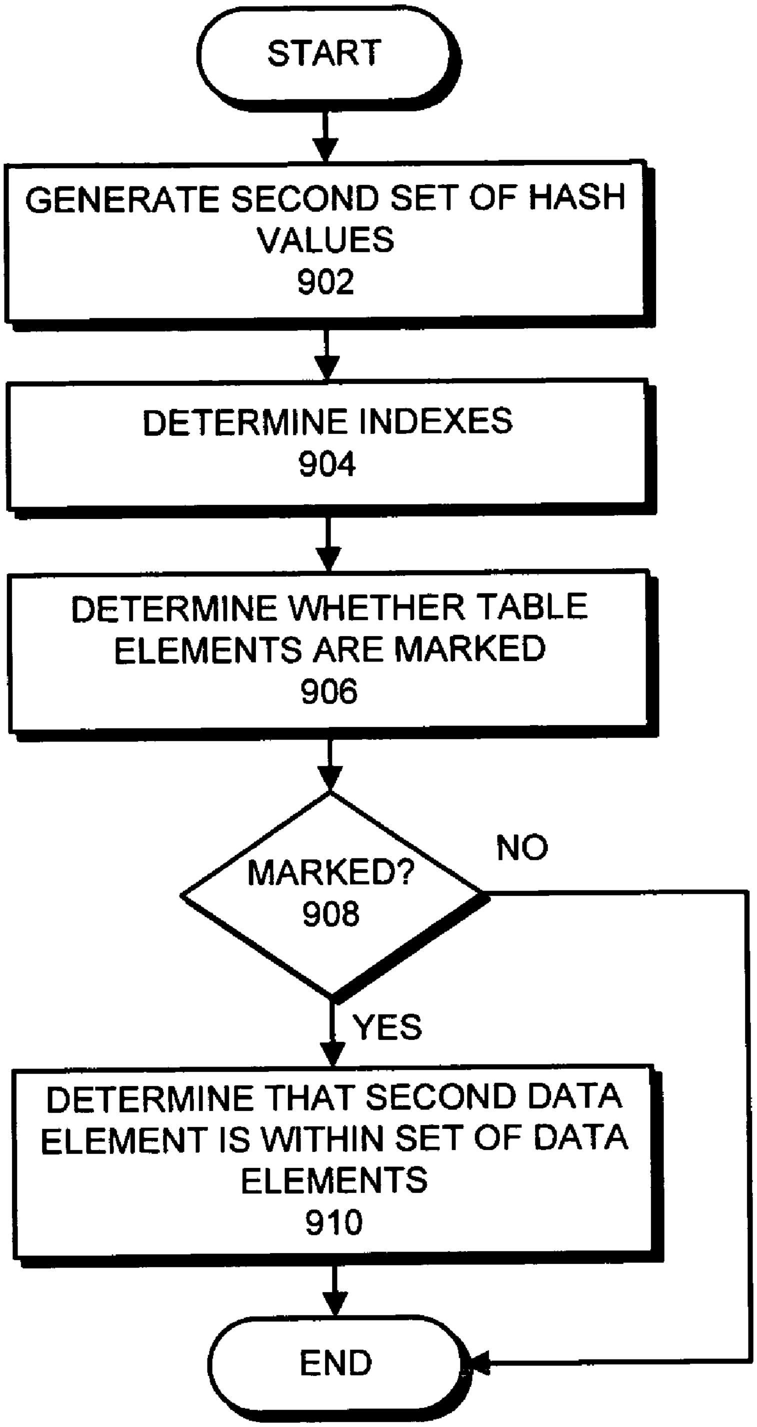
FIG. 9 presents a flow chart illustrating the process of determining whether a data element is within a set of data elements observed from a data stream using a table in accordance with an embodiment of the present invention.

FIG. 9 presents a flow chart illustrating the process of determining whether a data element is within a set of data elements observed from a data stream using a table in accordance with an embodiment of the present invention. The process begins when the system generates a second set of hash values using the second data element (step 902). Next, the system determines indexes along the second axis of the table using the second set of hash values (step 904).

The system then determines whether the table elements that correspond to the indexes are marked (step 906). In one embodiment of the present invention, while determining whether the table elements that correspond to the indexes are marked, the system determines whether one or more table elements along the first axis of the table that correspond to the indexes are marked. In another embodiment of the present invention, if the query is directed to a specific time interval, while determining whether the table elements that correspond to the indexes are marked, the system determines whether table elements that correspond to the specific time interval are marked.

If the table elements that correspond to the indexes are marked (step 908—yes), the system determines that the second data element is within the set of data elements (step 910).

Figure 10:
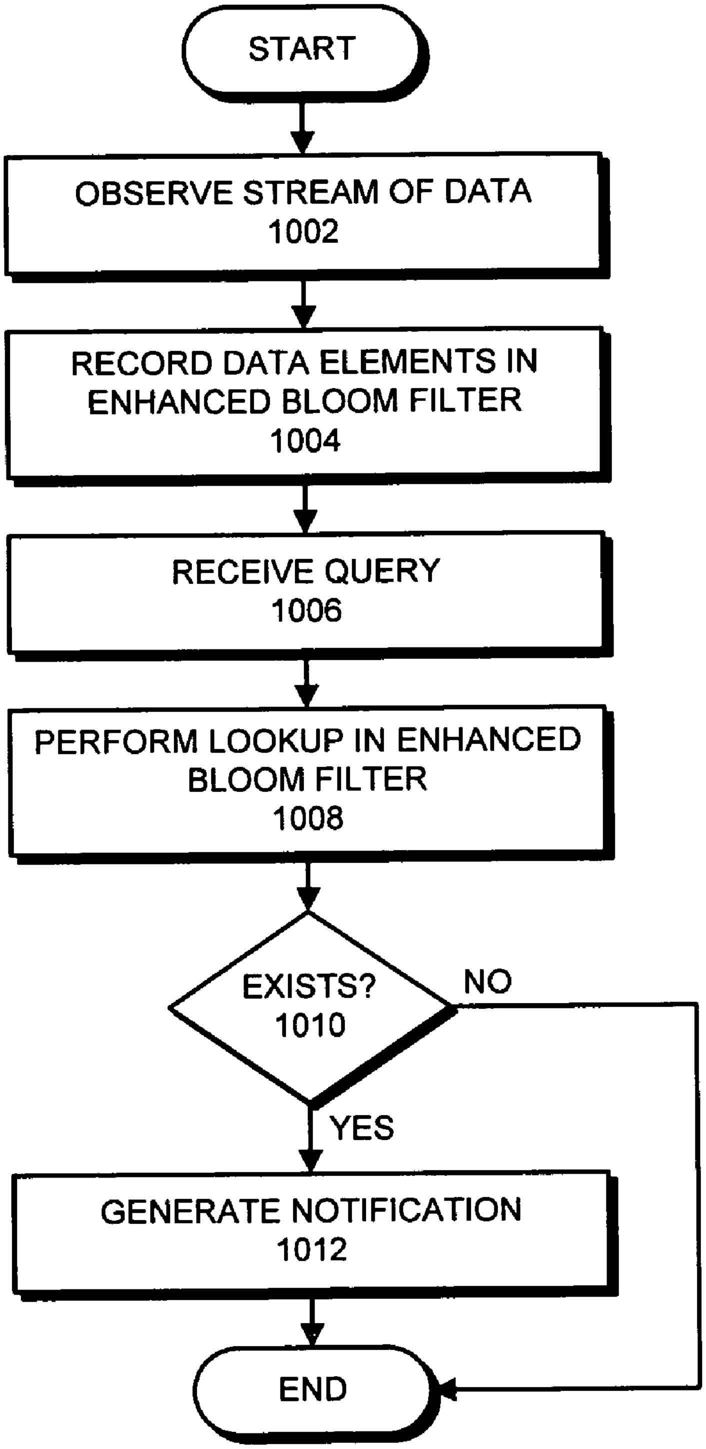
FIG. 10 presents a flow chart illustrating the process of determining whether a pattern of data elements was observed in a stream of data in accordance with an embodiment of the present invention.

FIG. 10 presents a flow chart illustrating the process of determining whether a pattern of data elements was observed in a stream of data in accordance with an embodiment of the present invention. The process begins when the system observes the stream of data (step 1002). Next, the system records data elements observed in the stream of data in an enhanced Bloom filter, wherein the enhanced Bloom filter includes multiple instances of a Bloom filter, and wherein each instance of the Bloom filter is associated with a different time interval (step 1004).

In one embodiment of the present invention, the pattern of data elements comprises a data element which is observed in multiple time intervals, and determining whether the pattern of data elements was observed involves determining whether the data element was observed in multiple instances of the Bloom filter within the enhanced Bloom filter.

In one embodiment of the present invention, the pattern of data elements comprises multiple data elements which are observed in multiple time intervals, and determining whether the pattern of data elements was observed involves determining whether the multiple data elements were observed in multiple corresponding instances of the Bloom filter within the enhanced Bloom filter.

In one embodiment of the present invention, the pattern of data elements comprises multiple data elements which are observed in a given time interval, and determining whether the pattern of data elements was observed involves determining whether the multiple data elements were observed in a corresponding instance of the Bloom filter within the enhanced Bloom filter.

In one embodiment of the present invention, the data elements are network packets.

Returning to FIG. 10, the system then receives a query which seeks to determine whether the pattern of data elements was observed in the stream of data (step 1006). In response to the query, the system performs a lookup in the enhanced Bloom filter to determine whether the pattern of data elements was observed in the stream of data (step 1008). If so (step 1010—yes), the system generates a notification that the pattern of data elements was observed (step 1012).

In one embodiment of the present invention, in response to the notification, the system performs a remedial action. For example, the system can reject network packets that match the pattern, block network packets directed to specified ports to prevent a computer virus from spreading, block comments from identified spam blogs from being automatically posted on other blogs, and any other remedial action based on the pattern specified in the query.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using a computer to determine whether a pattern of data elements was observed in a stream of data, comprising:

observing the stream of data;

recording data elements observed in the stream of data in an enhanced Bloom filter that comprises multiple instances of a Bloom filter, each instance of the Bloom filter being associated with a separate and different time interval, wherein recording a data element comprises updating a record in corresponding elements in each instance of the Bloom filter;

receiving a query which seeks to determine whether the pattern of data elements was observed in the stream of data;

in response to the query, performing a number of lookups in the enhanced Bloom filter to determine whether the pattern of data elements was observed in the stream of data; and if so, generating a notification that the pattern of data elements was observed.

2. The method of claim 1, wherein the pattern of data elements comprises a data element which is observed in multiple time intervals; and wherein determining whether the pattern of data elements was observed involves determining whether the data element was observed in multiple instances of the Bloom filter within the enhanced Bloom filter.

3. The method of claim 1, wherein the pattern of data elements comprises multiple data elements which are observed in multiple time intervals; and wherein determining whether the pattern of data elements was observed involves determining whether the multiple data elements were observed in multiple corresponding instances of the Bloom filter within the enhanced Bloom filter.

4. The method of claim 1, wherein the pattern of data elements comprises multiple data elements which are observed in a given time interval; and wherein determining whether the pattern of data elements was observed involves determining whether the multiple data elements were observed in a corresponding instance of the Bloom filter within the enhanced Bloom filter.

5. The method of claim 1, wherein the data elements are network packets.

6. The method of claim 5, wherein the network packets are generated during an interaction between a user and an Internet advertisement; and wherein the query is used to identify instances of click fraud, which involves automatically or a manually clicking on an Internet advertisement to fraudulently generate a clickthrough for the Internet advertisement.

7. The method of claim 5, wherein the network packets are generated by a computer virus attempting to infect computer systems; and wherein the query is used to identify a cluster of packets sent by the computer virus from an infected computer system to multiple ports on other computer systems.

8. The method of claim 5, wherein the network packets are generated by inter blog communications; and wherein the query is used to identify spam pings and spam comments, which are comments posted on spam blogs that are automatically propagated to other blogs with the intent to direct traffic to a specified website.

9. A non-transitory computer-readable storage medium storing instructions that when executed by a computer cause the computer to perform a method for determining whether a pattern of data elements was observed in a stream of data, wherein the method comprises:

observing the stream of data;

recording data elements observed in the stream of data in an enhanced Bloom filter that comprises multiple instances of a Bloom filter, each instance of the Bloom filter being associated with a separate and different time interval, wherein recording a data element comprises updating a record in corresponding elements in each instance of the Bloom filter;

receiving a query which seeks to determine whether the pattern of data elements was observed in the stream of data;

in response to the query, performing a number of lookups in the enhanced Bloom filter to determine whether the pattern of data elements was observed in the stream of data; and if so, generating a notification that the pattern of data elements was observed.

10. The computer-readable storage medium of claim 9, wherein the pattern of data elements comprises a data element which is observed in multiple time intervals; and wherein determining whether the pattern of data elements was observed involves determining whether the data element was observed in multiple instances of the Bloom filter within the enhanced Bloom filter.

11. The computer-readable storage medium of claim 9, wherein the pattern of data elements comprises multiple data elements which are observed in multiple time intervals; and wherein determining whether the pattern of data elements was observed involves determining whether the multiple data elements were observed in multiple corresponding instances of the Bloom filter within the enhanced Bloom filter.

12. The computer-readable storage medium of claim 9, wherein the pattern of data elements comprises multiple data elements which are observed in a given time interval; and wherein determining whether the pattern of data elements was observed involves determining whether the multiple data elements were observed in a corresponding instance of the Bloom filter within the enhanced Bloom filter.

13. The computer-readable storage medium of claim 9, wherein the data elements are network packets.

14. The computer-readable storage medium of claim 13, wherein the network packets are generated during an interaction between a user and an Internet advertisement; and wherein the query is used to identify instances of click fraud, which involves automatically or a manually clicking on an Internet advertisement to fraudulently generate a clickthrough for the Internet advertisement.

15. The computer-readable storage medium of claim 13, wherein the network packets are generated by a computer virus attempting to infect computer systems; and wherein the query is used to identify a cluster of packets sent by the computer virus from an infected computer system to multiple ports on other computer systems.

16. The computer-readable storage medium of claim 13, wherein the network packets are generated by inter blog communications; and wherein the query is used to identify spam pings and spam comments, which are comments posted on spam blogs that are automatically propagated to other blogs with the intent to direct traffic to a specified website.

17. An apparatus that determines whether a pattern of data elements was observed in a stream of data, comprising:

a processor;

a memory;

a storage device; and a data monitoring mechanism configured to:

observe the stream of data;

record data elements observed in the stream of data in an enhanced Bloom filter that comprises multiple instances of a Bloom filter, each instance of the Bloom filter being associated with a separate and different time interval, wherein recording a data element comprises updating a record in corresponding elements in each instance of the Bloom filter;

receive a query which seeks to determine whether the pattern of data elements was observed in the stream of data;

in response to the query, to perform a number of lookups in the enhanced Bloom filter to determine whether the pattern of data elements was observed in the stream of data; and if so, to generate a notification that the pattern of data elements was observed.

* * * * *